United States Patent Office 3,196,176
Patented July 20, 1965

3,196,176
PURIFICATION OF ACETIC ACID
Wilson W. Howell, Pampa, Tex., assignor to Celanese Corporation of America, New York, N.Y., a corporation of Delaware
No Drawing. Filed Mar. 7, 1962, Ser. No. 177,958
8 Claims. (Cl. 260—541)

This invention relates to the purification of plant streams of acetic acid. It more particularly relates to the purification of acetic acid streams containing formic acid by the removal of formic acid therefrom.

This invention includes the decomposition of formic acid by phosphoric acid. It more particularly includes the decomposition of formic acid in an acetic stream by phosphoric acid.

The decomposition of formic acid in an acetic acid stream is carried out by introducing the acetic acid stream into a reactor operating at elevated temperatures which reactor contains phosphoric acid. It is preferred that the phosphoric acid is liquid and that the contents of the reactor are agitated, as by mechanical stirring for example. The acetic acid stream is vaporized in the reactor and bubbles through the liquid phosphoric acid as a vapor. The formic acid content of the stream is decomposed by the phosphoric acid to carbon monoxide and water in the reactor. The vapors pass out of the reactor and through a condenser which separates the gaseous product, e.g. carbon monoxide, from the liquid products, e.g. acetic acid.

More particularly, this invention is practiced in a reactor operating at about 150 to 175° C. under asmospheric pressure or below. The acetic acid stream is preferably a liquid and is conveniently fed at a rate of about 0.019 to 0.151 pound per mole phosphoric acid, per hour. For particularly good operation, the reactor is maintained at 158 to 162° C. under a pressure of about 660 to 685 mm. Hg absolute for an acetic acid stream through-put of 0.089 to 0.013 pound per mole of phosphoric acid per hour. If needed, an anti-foaming agent may be included in the reaction mass. Dow Corning Antifoam B and palmitate ester of mixed $C_6$ alcohols have been found to be particularly effective as an anti-foaming additive and have been used in amounts from about 0.00005 to 0.001 part by weight based upon phosphoric acid content of the reactor. These anti-foaming agents are exemplary of the class.

A particular acetic acid stream, containing as the major constituents thereof 87.02 weight percent acetic acid and 8.85 weight percent formic acid was subjected to formic acid decomposition according to this invention. Table I, below, sets forth various operating conditions and product constitutions of several runs.

Table I

| Reactor Temp. (° C.) | Feed Rate (mls./mole $H_3PO_4$/hr.) | Product Composition | |
|---|---|---|---|
| | | Formic (Wt. percent) | Acetic (Wt. percent) |
| 153 | 8 | 0.37 | 95.38 |
| 152 | 25.1 | 1.87 | 92.03 |
| 151 | 64.8 | 2.55 | 92.03 |
| 160 | 38.6 | 1.54 | 92.40 |
| 170 | 44.6 | 1.18 | 92.78 |

It is to be understood that the foregoing detailed description is given merely by way of illustration and that many variations may be made therein without departing from the spirit of my invention.

Having described my invention what I desire to secure by Letters Patent is:

1. A process for purifying acetic acid containing formic acid as the major impurity comprising bringing said acetic acid in liquid form into intimate contact with liquid phosphoric acid at a temperature above the vaporization temperature of acetic acid, maintaining said acetic acid in said intimate contact with said phosphoric acid for a time sufficient to cause vaporization of acetic acid and withdrawing acetic acid vapors of substantially lower formic acid content than the initial acetic acid feed.

2. A process in accordance with claim 1 in which said acetic acid is bubbled through said liquid phosphoric acid and in which the withdrawn acetic acid vapors are passed through a condenser.

3. A process for purifying acetic acid containing formic acid as the major impurity comprising bringing said acetic acid in liquid form into intimate contact with liquid phosphoric acid at a temperature of 150° C to 175° C., at a maximum pressure of about atmospheric, maintaining said acetic acid in said intimate contact with said phosphoric acid for a time sufficient to cause vaporization of acetic acid and withdrawing acetic acid vapors of substantially lower formic acid content than the initial acetic acid feed.

4. A process for purifying acetic acid containing formic acid as the major impurity comprising bringing said acetic acid in liquid form into intimate contact with liquid phosphorc acid at a temperature of 158° C to 162° C., at a maximum pressure of about 660 to 685 mm. Hg absolute, maintaining said acetic acid in said intimate contact with said phophoric acid for a time sufficient to cause vaporization of acetic acid and withdrawing acetic acid vapors of substantially lower formic acid content than the initial acetic acid feed.

5. A process for purifying acetic acid containing formic acid as the major impurity comprising the steps of
    (a) bringing said acetic acid in liquid form into intimate contact with liquid phosphoric acid at a temperature of about 150 to 175° C., and a maximum pressure of about atmospheric;
    (b) bubbling said acetic acid through said phosphoric acid at a rate of about 0.019 to 0.151 pound of acetic acid feed per mol of phosphoric acid per hour;
    (c) withdrawing the vaporous effluent, and
    (d) condensing acetic acid therefrom,
whereby acetic acid of substantially reduced formic acid content is obtained.

6. A process in accordance with claim 5 wherein said liquid phosphoric acid contains from about 0.00005 to about 0.001 part by weight of an anti-foaming agent per part by weight of phosphoric acid.

7. A process for purifying acetic acid containing formic acid as the major impurity comprising the steps of
    (a) bringing said acetic acid in liquid form into intimate contact with liquid phosphoric acid at a temperature of about 158 to 162° C., under a pressure of about 660 to 685 mm. Hg absolute;
    (b) bubbling said acetic acid through said phosphoric acid at a rate of about 0.089 to 0.103 pound of acetic acid feed per mol of phosphoric acid per hour;
    (c) withdrawing the vaporous effluent, and
    (d) condensing acetic acid therefrom, whereby acetic acid of substantially reduced formic acid content is obtained.

8. A process in accordance with claim 7 wherein said liquid phosphoric acid contains from about 0.00005 to about 0.001 part by weight of an anti-foaming agent per part by weight of phosphoric acid.

References Cited by the Examiner
UNITED STATES PATENTS
2,688,635   9/54   Eberts _____ 260—541 XR

OTHER REFERENCES

Remy: Treatise on Inorganic Chemistry, vol. 1, pp. 636–637 (1956).

Gould: Inorganic Reactions and Structure, pp. 448–449 (1955).

LORRAINE A. WEINBERGER,
*Acting Primary Examiner.*

LEON ZITVER, *Examiner.*